(12) United States Patent
Yamaguchi et al.

(10) Patent No.: US 10,431,843 B2
(45) Date of Patent: Oct. 1, 2019

(54) FRAME BODY, CELL FRAME, CELL STACK, AND REDOX FLOW BATTERY

(71) Applicant: Sumitomo Electric Industries, Ltd., Osaka-shi (JP)

(72) Inventors: Hideyuki Yamaguchi, Osaka (JP); Takashi Kanno, Osaka (JP); Kenji Motoi, Osaka (JP); Takeshi Yamana, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/549,109

(22) PCT Filed: Oct. 5, 2016

(86) PCT No.: PCT/JP2016/079679
§ 371 (c)(1),
(2) Date: Aug. 4, 2017

(87) PCT Pub. No.: WO2018/066094
PCT Pub. Date: Apr. 12, 2018

(65) Prior Publication Data
US 2018/0248216 A1    Aug. 30, 2018

(51) Int. Cl.
| | |
|---|---|
| *H01M 8/00* | (2016.01) |
| *H01M 8/18* | (2006.01) |
| *H01M 8/0202* | (2016.01) |
| *H01M 8/0273* | (2016.01) |
| *H01M 2/38* | (2006.01) |
| *H01M 4/86* | (2006.01) |

(52) U.S. Cl.
CPC ............. *H01M 8/188* (2013.01); *H01M 2/38* (2013.01); *H01M 4/86* (2013.01); *H01M 8/0202* (2013.01); *H01M 8/0273* (2013.01); *H01M 2004/8684* (2013.01); *H01M 2004/8689* (2013.01); *Y02E 60/528* (2013.01)

(58) Field of Classification Search
CPC .................................. H01M 8/02; H01M 8/24
See application file for complete search history.

(56) References Cited

U.S. PATENT DOCUMENTS

| 5,508,131 A | * | 4/1996 | Bowen | ................ | H01M 2/0215 |
| | | | | | 429/178 |
| 6,087,033 A | * | 7/2000 | Grune | ................ | H01M 8/0271 |
| | | | | | 429/470 |
| 2013/0252042 A1 | * | 9/2013 | Kobayashi | ............... | H01G 2/10 |
| | | | | | 429/71 |

(Continued)

FOREIGN PATENT DOCUMENTS

| CN | 105378970 A | 3/2016 |
| JP | 2006-324117 A | 11/2006 |

(Continued)

*Primary Examiner* — Cynthia H Kelly
*Assistant Examiner* — Monique M Wills
(74) *Attorney, Agent, or Firm* — Baker Botts L.L.P; Michael A. Sartori (57) ABSTRACT

A frame body for a cell frame of a redox flow battery, the frame body including an outer peripheral portion, the outer peripheral portion including a thin region whose thickness gradually decreases in a direction from the center of the frame body toward the outer periphery of the frame body.

8 Claims, 9 Drawing Sheets

(56) References Cited

U.S. PATENT DOCUMENTS

| | | | | |
|---|---|---|---|---|
| 2015/0125768 A1* | 5/2015 | Mosso | ............... | H01M 8/0273 |
| | | | | 429/418 |
| 2015/0263360 A1* | 9/2015 | Cerceau | ............. | H01M 8/0273 |
| | | | | 429/465 |
| 2016/0126516 A1* | 5/2016 | Komiya | ............. | H01M 2/1077 |
| | | | | 429/153 |

FOREIGN PATENT DOCUMENTS

| | | |
|---|---|---|
| JP | 2012-216510 A | 11/2012 |
| JP | 2015-079738 A | 4/2015 |

\* cited by examiner

FRAME BODY, CELL FRAME, CELL STACK, AND REDOX FLOW BATTERY

TECHNICAL FIELD

The present invention relates to a frame body, a cell frame, a cell stack, and a redox flow battery.

BACKGROUND ART

Patent Literature 1 describes a cell stack in which a cell frame including a bipolar plate, a positive electrode, a membrane, a negative electrode, and a cell frame are repeatedly stacked, and the stack body is sandwiched between supply/drainage plates; and a redox flow battery including the cell stack. The cell frames include a bipolar plate and a frame body disposed on the outer periphery of the bipolar plate. In this configuration, a single cell is formed between the bipolar plates of adjacent cell frames.

CITATION LIST

Patent Literature

PTL 1: Japanese Unexamined Patent Application Publication No. 2015-79738

SUMMARY OF INVENTION

A frame body according to the present disclosure is
a frame body for a cell frame of a redox flow battery,
the frame body including an outer peripheral portion,
the outer peripheral portion including a thin region whose thickness gradually decreases in a direction from a center of the frame body toward an outer periphery of the frame body.
A cell frame according to the present disclosure includes
the frame body according to the present disclosure, and a bipolar plate supported by the frame body.
A cell stack according to the present disclosure includes
the cell frame according to the present disclosure.
A redox flow battery according to the present disclosure includes
the cell stack according to the present disclosure.

DESCRIPTION OF EMBODIMENTS

Technical Problem

The frame body of an existing cell frame has a rectangular shape in a section taken in the thickness direction of the outer peripheral portion of the frame body viewed in plan. As a result, for example, when plural cell frames are stacked and when the plural cell frames stacked are fastened, a corner portion constituting the outer edge of the frame body of one of adjacent cell frames may damage the frame body of the other cell frame. Since cell frames of a cell stack are often produced by injection molding of injecting resin into a mold, cell frames may break due to such damage caused by corner portions.

Accordingly, an object of the present disclosure is to provide a frame body and a cell frame that are less likely to be damaged during stacking or during fastening. Another object of the present disclosure is to provide a cell stack in which stacked cell frames are less likely to be damaged. Still another object of the present disclosure is to provide a redox flow battery including a cell stack in which cell frames are less likely to be damaged.

Advantageous Effects of Disclosure

A frame body and a cell frame according to the present disclosure are less likely to be damaged during stacking. In a cell stack and a redox flow battery according to the present disclosure, the frame bodies of cell frames constituting the cell stack and the redox flow battery are less likely to be damaged.

DESCRIPTION OF EMBODIMENTS ACCORDING TO INVENTION OF THE PRESENT APPLICATION

Features of embodiments according to the invention of the present application will be first listed and described.
<1> A frame body according to an embodiment is
a frame body for a cell frame of a redox flow battery,
the frame body including an outer peripheral portion,
the outer peripheral portion including a thin region whose thickness gradually decreases in a direction from a center of the frame body toward an outer periphery of the frame body.

The frame body having such a configuration enables, during stacking of plural cell frames or during fastening of the stacked cell frames, suppression of contact between a portion constituting the outer edge of the frame body of one of adjacent cell frames, and the frame body of the other cell frame, to thereby suppress damaging to the other cell frame. This enables avoidance of problems due to the damaged frame body of a cell frame, for example, a problem of leakage of an electrolyte from between adjacent cell frames. Incidentally, the thin region may be formed along the whole periphery of the outer peripheral portion, or the thin region may be formed in a portion of the outer peripheral portion.
<2> The frame body according to the embodiment may have a configuration in which, in a section taken along a plane passing through the center of the frame body and extending in a thickness direction of the frame body, the thin region has a sectional shape that is a pencil-down shape.

The thin region is formed so as to have a sectional shape that is a pencil-down shape, which enables effective suppression of contact between a portion constituting the outer edge of the frame body of one of adjacent cell frames, and the frame body of the other cell frame, to thereby effectively suppress damaging to the other cell frame.

<3> The frame body according to the embodiment may have a configuration in which, in a section taken along a plane passing through the center of the frame body and extending in a thickness direction of the frame body, the thin region has a sectional shape that is a rectangular shape having rounded corner portions.

The thin region is formed so as to have a sectional shape that is a rectangular shape having rounded corner portions, which enables effective suppression of contact between a portion constituting the outer edge of the frame body of one of adjacent cell frames, and the frame body of the other cell frame, to thereby effectively suppress damaging to the other cell frame.

<4> The frame body according to the embodiment may have a configuration in which, in a section taken along a plane passing through the center of the frame body and extending in a thickness direction of the frame body, the thin region has a sectional shape that is a rectangular shape having C-chamfered corner portions.

The thin region is formed so as to have a sectional shape that is a rectangular shape having C-chamfered corner portions, which enables effective suppression of contact between a portion constituting the outer edge of the frame body of one of adjacent cell frames, and the frame body of the other cell frame, to thereby effectively suppress damaging to the other cell frame.

<5> The frame body according to the embodiment may have a configuration in which, in a section taken along a plane passing through the center of the frame body and extending in a thickness direction of the frame body, the thin region has a sectional shape that is solely constituted by a curve.

At least a portion of the outer peripheral portion is rounded, which enables effective suppression of contact between a portion constituting the outer edge of the frame body of one of adjacent cell frames, and the frame body of the other cell frame, to thereby effectively suppress damaging to the other cell frame.

<6> A cell frame according to an embodiment includes the frame body according to the embodiment, and a bipolar plate supported by the frame body.

The cell frame having such a configuration enables, during stacking of plural cell frames or during fastening of the stacked cell frames, suppression of contact between a portion constituting the outer edge of the frame body of one of adjacent cell frames, and the frame body of the other cell frame, to thereby suppress damaging to the other cell frame. This enables avoidance of problems due to the damaged frame body of a cell frame, for example, a problem of leakage of an electrolyte from between adjacent cell frames.

<7> A cell stack according to an embodiment includes the cell frame according to the embodiment.

In the cell stack according to the embodiment, stacked cell frames serving as one of the constituent elements are less likely to be damaged. This enables avoidance of problems due to a damaged cell frame, for example, a problem of leakage of an electrolyte from between adjacent cell frames when the cell stack according to the embodiment is used to constitute a redox flow battery.

<8> A redox flow battery according to an embodiment includes the cell stack according to the embodiment.

The redox flow battery according to the embodiment is a redox flow battery including a cell stack in which cell frames are less likely to be damaged. As a result, the redox flow battery according to the embodiment is a redox flow battery that enables avoidance of problems due to a damaged cell frame, for example, a problem of leakage of an electrolyte from between adjacent cell frames.

DETAILS OF EMBODIMENTS ACCORDING TO THE PRESENT INVENTION

Hereinafter, redox flow batteries (RF batteries) according to embodiments will be described. However, the present invention is not limited to the configurations illustrated in the embodiments. The present invention is defined by Claims and is intended to embrace all the modifications within the meaning and range of equivalency of the Claims.

Embodiment 1

An RF battery according to Embodiment 1 will be described on the basis of FIG. 1 to FIG. 5.

<<RF Battery>>

Figure 1:
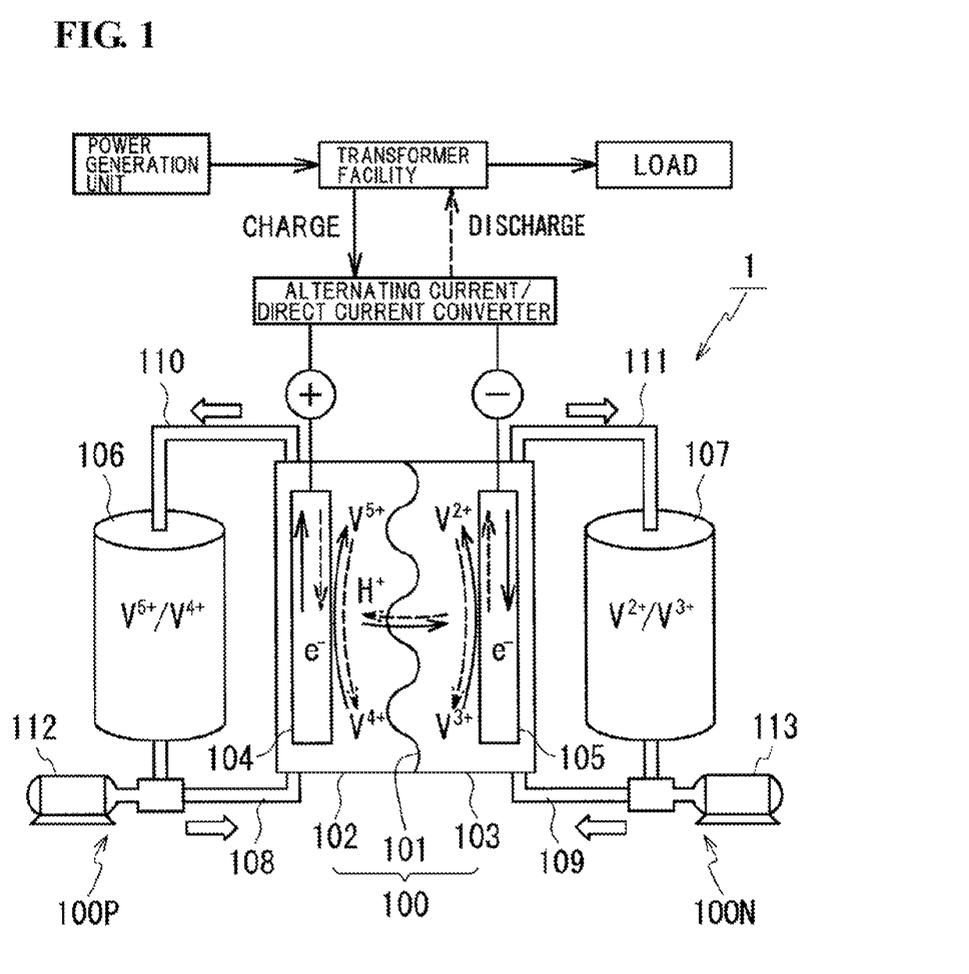
FIG. 1 illustrates the principle of operations of a redox flow battery according to Embodiment 1.

The RF battery is one of electrolyte-circulation storage batteries, and is used for storage of electricity of new energy from solar photovoltaic power generation and wind power generation. As illustrated in FIG. 1, which illustrates the principle of operations of an RF battery 1, the RF battery 1 is a battery configured to be charged and discharged by means of the difference between the oxidation-reduction potential of active material ions contained in a positive electrode electrolyte, and the oxidation-reduction potential of active material ions contained in a negative electrode electrolyte. The RF battery 1 includes a cell 100, which is divided, by a membrane 101 permeable to hydrogen ions, into a positive electrode cell 102 and a negative electrode cell 103.

The positive electrode cell 102 includes a positive electrode 104 therein; and, to the positive electrode cell 102, a positive electrode electrolyte tank 106 storing a positive electrode electrolyte is connected via ducts 108 and 110. The duct 108 is equipped with a pump 112. These members 106, 108, 110, and 112 constitute a positive electrode circulation mechanism 100P configured to circulate the positive electrode electrolyte. Similarly, the negative electrode cell 103 includes a negative electrode 105 therein; and, to the negative electrode cell 103, a negative electrode electrolyte tank 107 storing a negative electrode electrolyte is connected via ducts 109 and 111. The duct 109 is equipped with a pump 113. These members 107, 109, 111, and 113 constitute a negative electrode circulation mechanism 100N configured to circulate the negative electrode electrolyte. The electrolytes stored in the tanks 106 and 107 are circulated through the cells 102 and 103 with the pumps 112 and 113 during charge and discharge. When charge or discharge is not performed, the pumps 112 and 113 are stopped and the electrolytes are not circulated.

<<Cell Stack>>

Figure 2:
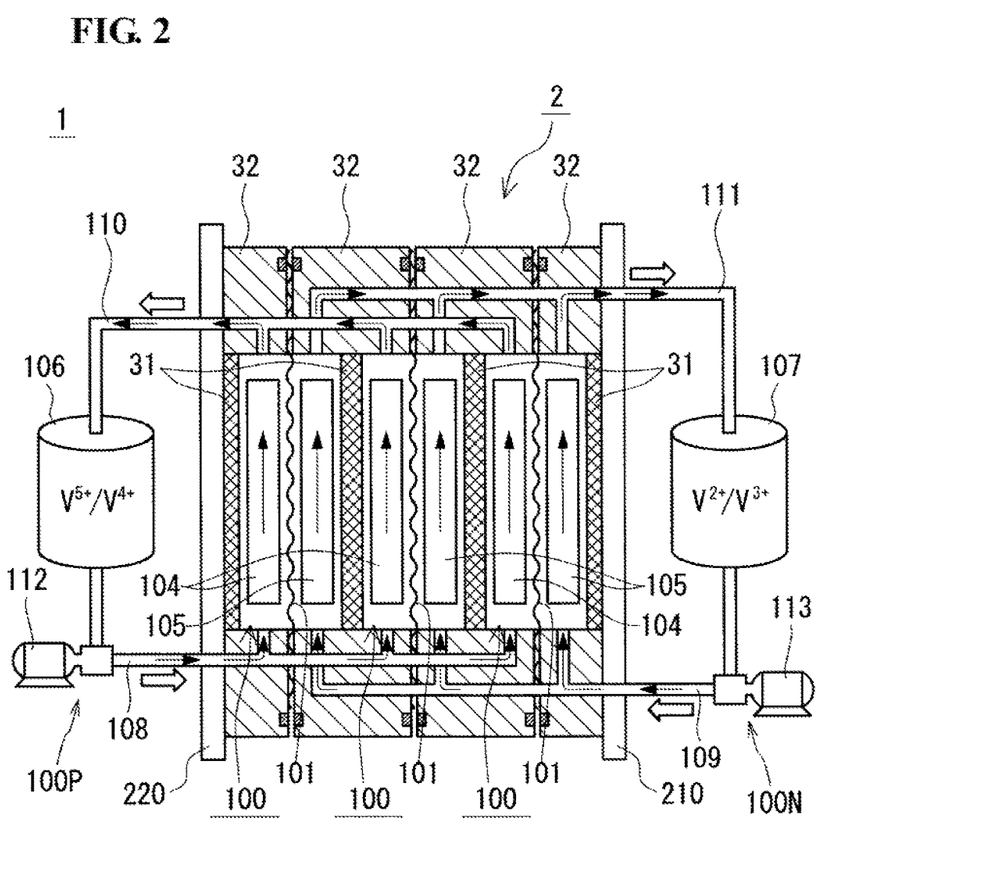
FIG. 2 is a schematic configuration view of a redox flow battery according to Embodiment 1.
Figure 3:
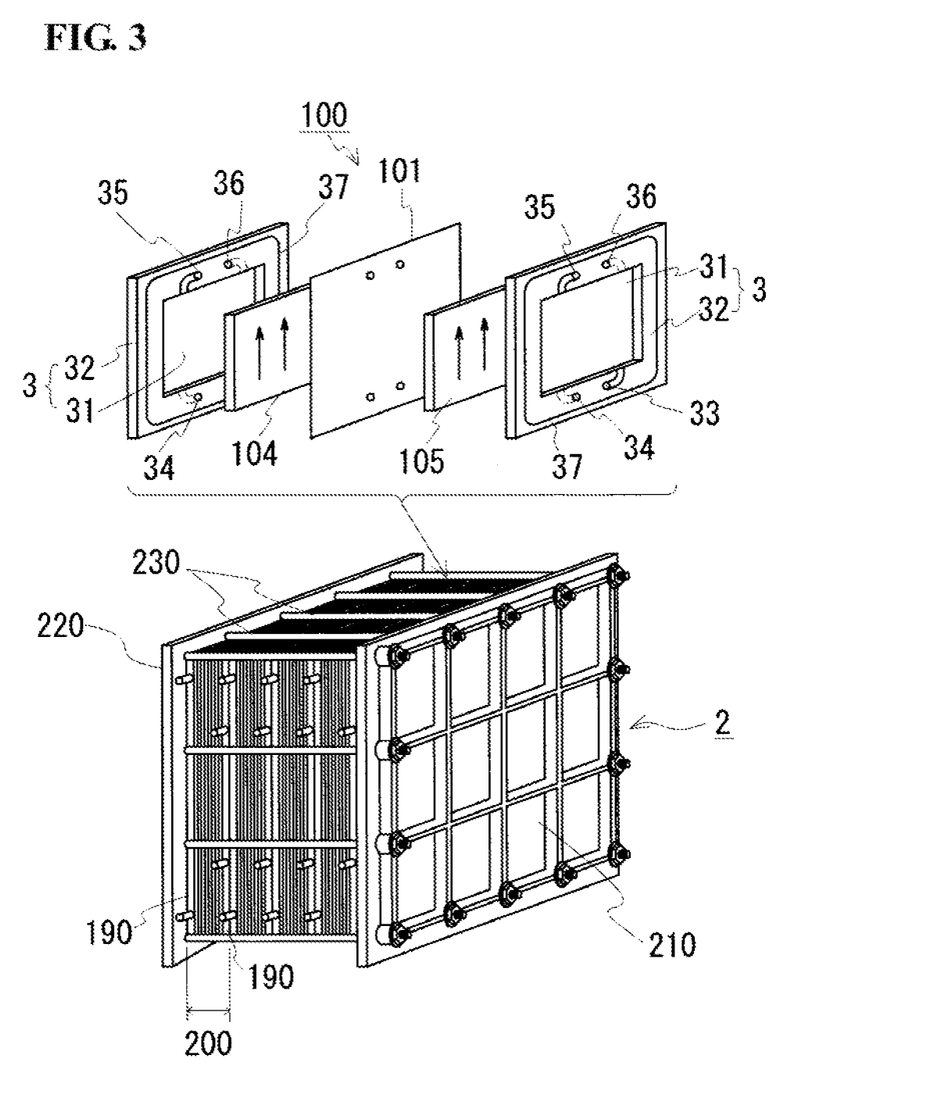
FIG. 3 is a schematic configuration view of a cell stack according to Embodiment 1.

The cell 100 is normally formed within a structure referred to as a cell stack 2, which is illustrated in FIG. 2 and FIG. 3. The cell stack 2 is constituted by sandwiching a stack structure referred to as a substack 200 (FIG. 3), from its both sides by two end plates 210 and 220, and by fastening the substack 200 with a fastening mechanism 230 (in the configuration provided as an example in FIG. 3, plural substacks 200 are used).

Such a substack 200 (FIG. 3) has a configuration in which the cell frame 3, the positive electrode 104, the membrane 101, the negative electrode 105, and the cell frame 3 are repeatedly stacked, and the stack body is sandwiched between supply/drainage plates 190 and 190 (refer to the lower drawing in FIG. 3; omitted in FIG. 2). Such a cell frame 3 includes a frame body 32 having a through window and a bipolar plate 31, which covers the through window. The positive electrode 104 is disposed so as to be in contact with one of the surfaces of the bipolar plate 31, and the negative electrode 105 is disposed so as to be in contact with the other surface of the bipolar plate 31. In this configuration, a single cell 100 is formed between the bipolar plates 31 of adjacent cell frames 3.

Supply and drainage of electrolytes through the supply/drainage plates 190 and 190 to and from the cell 100 are performed with liquid supply manifolds 33 and 34 and liquid drainage manifolds 35 and 36 formed in the cell frame 3. The positive electrode electrolyte is supplied through the liquid supply manifold 33, then through an inlet slit formed in one surface of the cell frame 3 (the surface illustrated as being exposed in the drawing), to the positive electrode 104; and the positive electrode electrolyte is drained through an outlet slit formed in an upper portion of the cell frame 3 to the liquid drainage manifold 35. Similarly, the negative electrode electrolyte is supplied through the liquid supply manifold 34, then through an inlet slit (represented by broken lines) formed in the other surface of the cell frame 3 (the surface illustrated as being hidden in the drawing), to the negative electrode 105; and the negative electrode electrolyte is drained through an outlet slit (represented by broken lines) formed in an upper portion of the cell frame 3 to the liquid drainage manifold 36. Loop-shaped sealing members 37 such as O-rings or flat gaskets are individually disposed between the cell frames 3 to suppress leakage of electrolytes from the substack 200.

The frame body 32 of the cell frame 3 is an injection-molded body produced by injection molding. When such frame bodies 32 have an outer-periphery sectional shape that is rectangular and plural cell frames 3 are stacked, a corner portion of the rectangle constituting the outer edge of the frame body 32 of one of adjacent cell frames 3 may come into contact with the frame body 32 of the other cell frame 3 and may damage the frame body 32 of the other cell frame 3. When the frame body 32 of such a cell frame 3 is damaged, for example, broken, problems such as leakage of an electrolyte from the cell stack 2 may occur.

In order to address such problems, the RF battery 1 of this example is provided such that the cell frames 3 in the cell stack 2 have a thin region. The thin region will be described in detail on the basis of FIG. 4 and FIG. 5.

Figure 4:
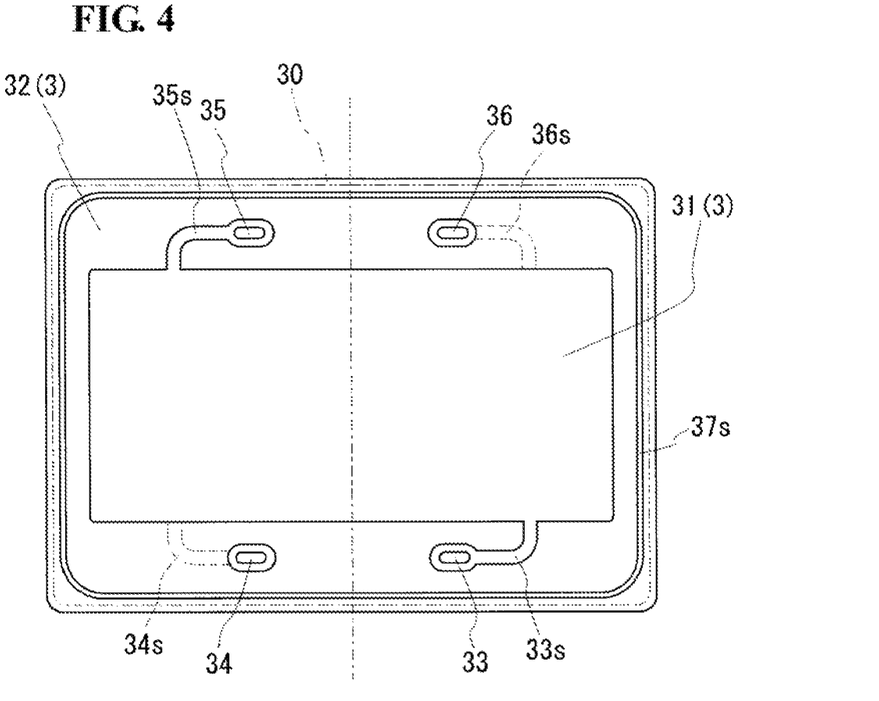
FIG. 4 is a plan view of a cell frame according to Embodiment 1.

FIG. 4 is a plan view of the cell frame 3 according to Embodiment 1. In this example, a direction in which the liquid supply manifold 33 (34) and the liquid drainage manifold 36 (35) are separated from each other, that is, the vertical direction in the drawing of FIG. 4, is the length direction of the frame body 32; a direction in which the liquid supply manifold 33 and the liquid supply manifold 34 are separated from each other, that is, the horizontal direction in the drawing, is the width direction of the frame body 32; and the depth direction in the drawing is the thickness direction of the frame body 32. A sealing groove 37s, which surrounds the outer periphery of the manifolds 33 to 36 of the cell frame 3, is a groove into which the sealing member 37 in FIG. 3 is inserted. Incidentally, FIG. 4 illustrates mere examples and does not particularly place limitations in terms of the shapes and positions of the manifolds 33 to 36 and the shapes and arrangements of the inlet slits and the outlet slits extending from the manifolds 33 to 36 to the bipolar plate 31.

In FIG. 4, the frame body 32 of the cell frame 3 according to this embodiment includes a thin region 30 (region on the outer-edge side beyond the double dot-dashed line), which has, in plan view, a predetermined width from the outer edge toward the inside. The thin region 30 is a region whose thickness gradually decreases from its formation start position (the position marked with the double dot-dashed line) on the center side of the cell frame 3, toward the outer edge. The width of the thin region 30, that is, the distance from the position marked with the double dot-dashed line to the outer edge, is preferably 0.1 mm or more and 100 mm or less, more preferably 1 mm or more and 80 mm or less, or 5 mm or more and 50 mm or less.

Such thin regions 30 provided in the frame bodies 32 of cell frames 3 enable, during stacking of the plural cell frames 3 or during fastening of the stacked cell frames 3, suppression of contact between a portion constituting the outer edge of the frame body 32 of one of adjacent cell frames 3, and the frame body 32 of the other cell frame 3, to thereby suppress damaging to the other cell frame 3. This enables avoidance of problems due to the damaged frame body 32 of a cell frame 3, for example, a problem of leakage of an electrolyte from between adjacent cell frames 3.

Figure 5:
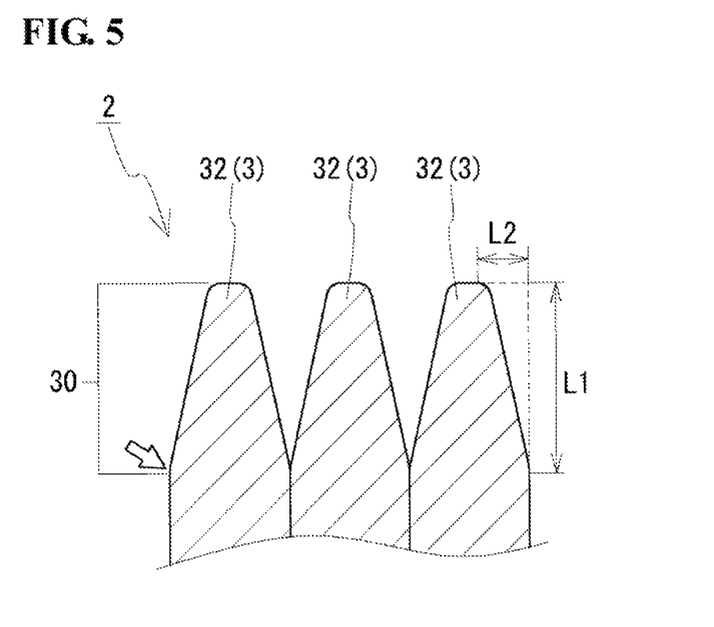
FIG. 5 is a partial longitudinal sectional view of a cell stack according to Embodiment 1.

The sectional shape of the thin region 30 in the thickness direction of the cell frame 3 is not particularly limited as long as the thickness of the sectional shape gradually decreases toward the outer edge. An example of the sectional shape of the thin region 30 will be described on the basis of FIG. 5. FIG. 5 illustrates a portion of a section taken along a line represented by the single dot-dashed line in FIG. 4 (a portion of a section passing through the center of the frame body 32 and extending in the thickness direction of the frame body 32).

In the example illustrated in FIG. 5, the thin region 30 is formed so as to have a sectional shape that is a pencil-down shape. The pencil-down shape is a tapered shape that is similar to the tip portion of a pencil. In this example, the tip of the pencil-down shape is rounded. Thus, a length L1, in a direction along the flat surfaces of the cell frame 3, from a formation start position to an outer edge of the thin region 30, is larger than a length L2, in the thickness direction of the cell frame 3, from a formation start position to an outer edge of the thin region 30. The length L1 is not particularly limited as long as it is at least 5 mm shorter than the length from the outer edge to the sealing groove 37s in FIG. 4. For example, the length L is preferably 1 mm or more and 30 mm or less, more preferably 5 mm or more and 10 mm or less. The length L2 is not particularly limited as long as it is ½ or less of the thickness of the cell frame 3. For example, the length L2 is preferably 0.1 mm or more and 2.5 mm or less, more preferably 1 mm or more and 1.5 mm or less.

In the configuration of this example, the boundary portions (refer to the white arrow in FIG. 5) between the thin region 30 and the flat surface portions are preferably provided so as to have curved surfaces (curves in the section). The boundary portions are provided so as to have curved surfaces, which enables suppression of damaging by a boundary portion of one of adjacent cell frames 3 to the other cell frame 3.

Embodiment 2

In Embodiment 2, the configuration of a cell stack 2 including cell frames 3 having a thin region 30 having a sectional shape different from that in Embodiment 1 will be described on the basis of FIG. 6. The same configuration as in Embodiment 1 may be employed except for the sectional shape of the thin region 30.

Figure 6:
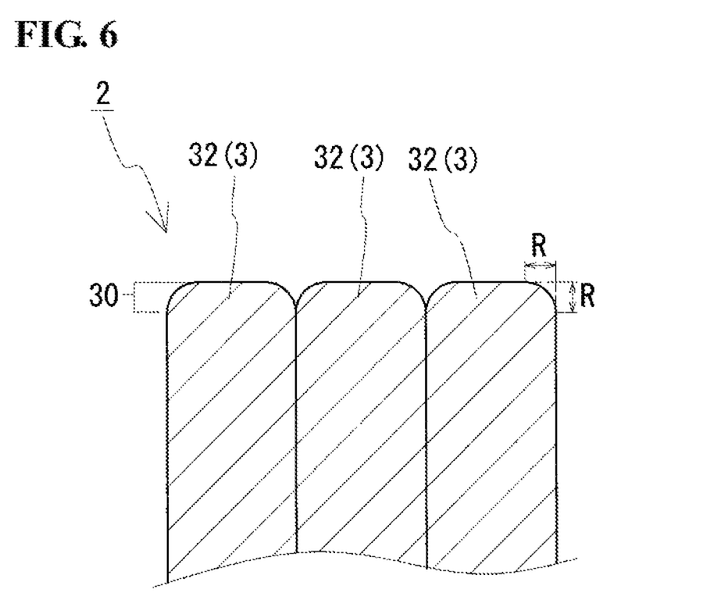
FIG. 6 is a partial longitudinal sectional view of a cell stack according to Embodiment 2.

In the example illustrated in FIG. 6, the thin region 30 is formed so as to have a sectional shape in which corner portions (refer to the dotted lines) of the rectangle are rounded. The value of a rounding radius R is not particularly limited as long as it is ½ or less of the thickness of the cell frame 3. For example, the rounding radius R is preferably 0.1 mm or more and 2.5 mm or less, more preferably 1.0 mm or more and 1.5 mm or less.

Embodiment 3

In Embodiment 3, the configuration of a cell stack 2 including cell frames 3 having a thin region 30 having a sectional shape different from the sectional shapes in Embodiments 1 and 2 will be described on the basis of FIG. 7. The same configuration as in Embodiment 1 may be employed except for the sectional shape of the thin region 30.

Figure 7:
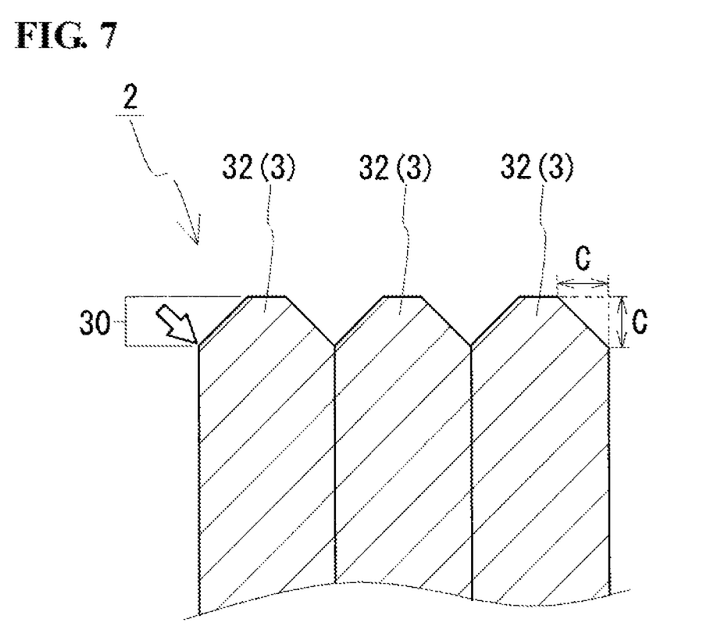
FIG. 7 is a partial longitudinal sectional view of a cell stack according to Embodiment 3.

In the example illustrated in FIG. 7, the thin region 30 is formed so as to have a sectional shape in which corner portions (refer to the dotted lines) of the rectangle are C-chamfered. The value of a chamfering length C is not particularly limited as long as it is ½ or less of the thickness of the cell frame 3. For example, the chamfering length C is preferably 0.1 mm or more and 2.5 mm or less, more preferably 1.0 mm or more and 1.5 mm or less.

In the configuration of this example, the boundary portions (refer to the white arrow) between the thin region 30 and the flat surface portions are preferably provided so as to have curved surfaces (curves in the section). The boundary portions are provided so as to have curved surfaces, which enables suppression of damaging by a boundary portion of one of adjacent cell frames 3 to the other cell frame 3.

Embodiment 4

In Embodiment 4, a cell stack 2 including cell frames 3 having a thin region 30 having a sectional shape solely constituted by a curve will be described on the basis of FIG. 8.

Figure 8:
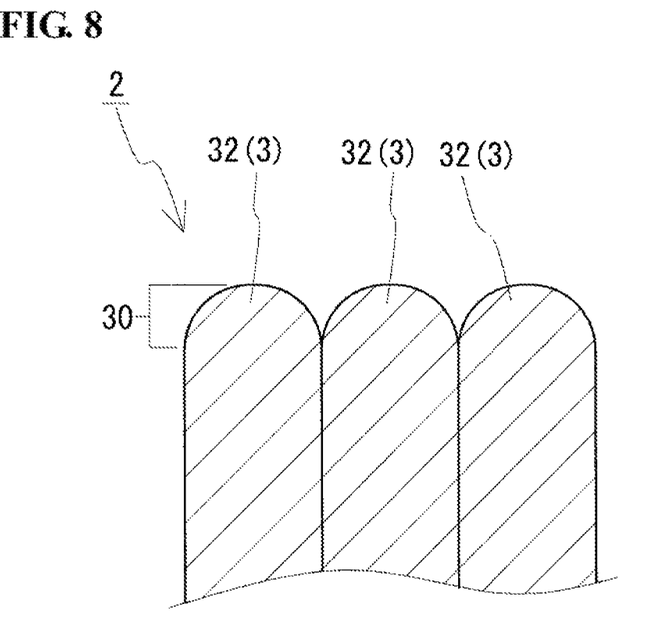
FIG. 8 is a partial longitudinal sectional view of a cell stack according to Embodiment 4.

In the example illustrated in FIG. 8, the thin region 30 is formed so as to have a sectional shape that is a semicircular (that is, curved) shape. Such a configuration also enables suppression of damaging by a boundary portion of one of adjacent cell frames 3 to the other cell frame 3.

Incidentally, the sectional shape of the thin region 30 is not limited to a semicircular shape as long as the sectional shape is solely constituted by a curve. For example, the sectional shape may be a semi-elliptical shape, or may be a shape in which the linear portions of the pencil-down shape in FIG. 5 are rounded.

Embodiment 5

In Embodiment 5, the configuration of a cell stack 2 including cell frames 3 having a thin region 30 having a sectional shape different from the sectional shapes in Embodiments 1 to 4 will be described on the basis of FIG. 9.

Figure 9:
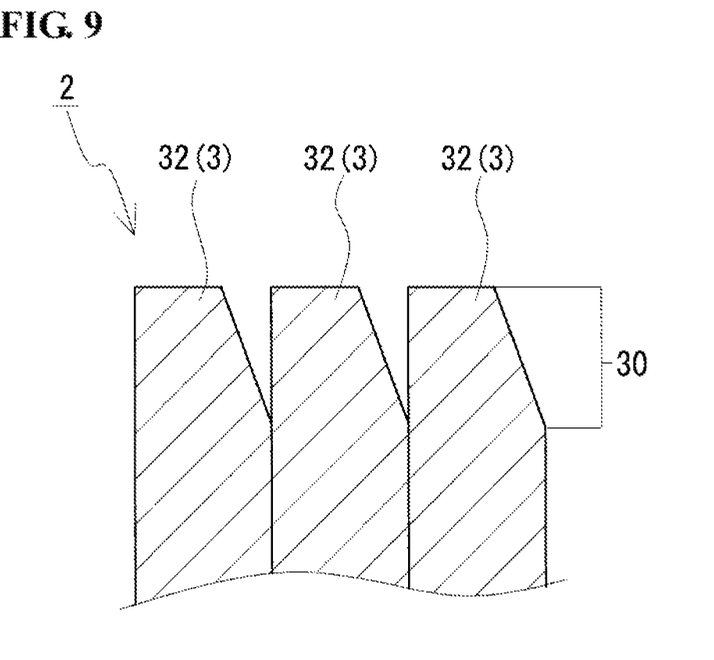
FIG. 9 is a partial longitudinal sectional view of a cell stack according to Embodiment 5.

In the example illustrated in FIG. 9, the thin region 30 is formed so as to have, in the thickness direction, inclination of only one surface of the outer peripheral portion of the frame body 32 of such a cell frame 3. Thus, the thin region 30 is formed so as to have a sectional shape that is a trapezoidal shape. Such a configuration also enables suppression of damaging in adjacent cell frames 3.

Embodiment 6

In Embodiments 1 to 5, between adjacent cell frames 3, the widths of the thin regions 30 formed (lengths from the formation start positions to the outer edges of the thin regions 30) are the same. In Embodiment 6, an example in which cell frames 3 have different widths of thin regions 30 formed will be described on the basis of FIG. 10.

Figure 10:
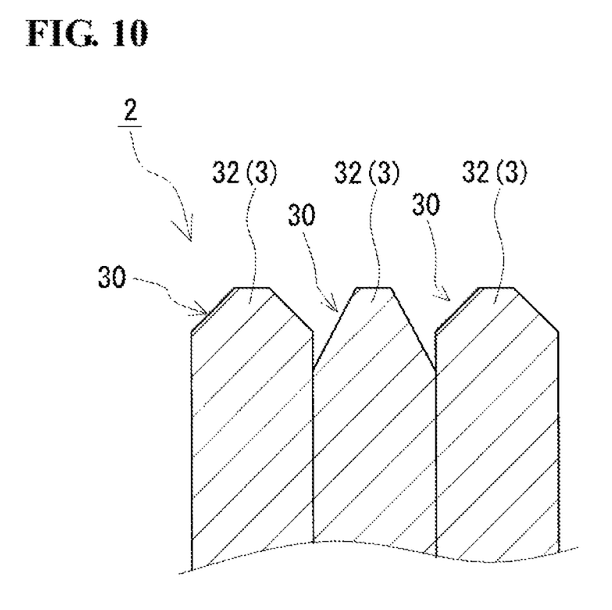
FIG. 10 is a partial longitudinal sectional view of a cell stack according to Embodiment 6.

As illustrated in FIG. 10, between adjacent cell frames 3, the widths of the thin regions 30 formed are different. This enables suppression of damaging in adjacent cell frames 3. In this example, the cell frames 3 on the left and on the right have thin regions 30 having a C-chamfered shape, and the cell frame 3 in the middle has a thin region 30 having a pencil-down shape; however, this combination places no limitations on the combination of cell frames 3. Cell frames 3 according to Embodiments 1 to 5 may be appropriately combined to constitute a cell stack 2.

Embodiment 7

Figure 11:
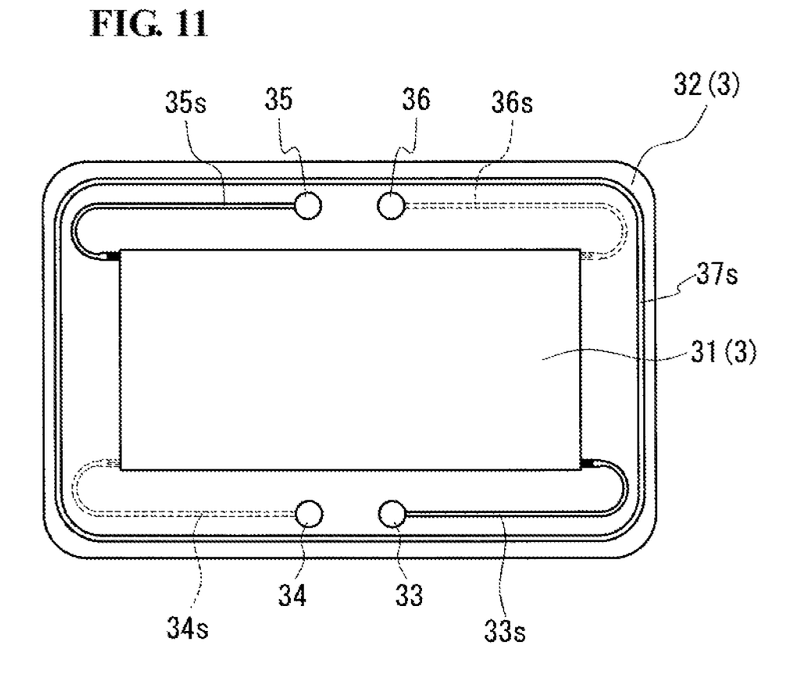
FIG. 11 is a plan view of a cell frame according to Embodiment 7.

The shape of the cell frame 3 is not limited to the shape in FIG. 4, and may be, for example, the shape illustrated in FIG. 11.

In the cell frame 3 in FIG. 11, slits 33*s*, 34*s*, 35*s*, and 36*s* in the frame body 32 substantially have a J-shape. Specifically, the slits extend outwardly from positions on the lateral side surfaces of the bipolar plate 31, and then bend inwardly and individually join the manifolds 33, 34, 35, and 36.

In such cell frames 3 having the shape, formation of thin regions 30 according to Embodiments 1 to 6 also enables suppression of damaging to the frame bodies 32.

Embodiment 8

Figure 12:
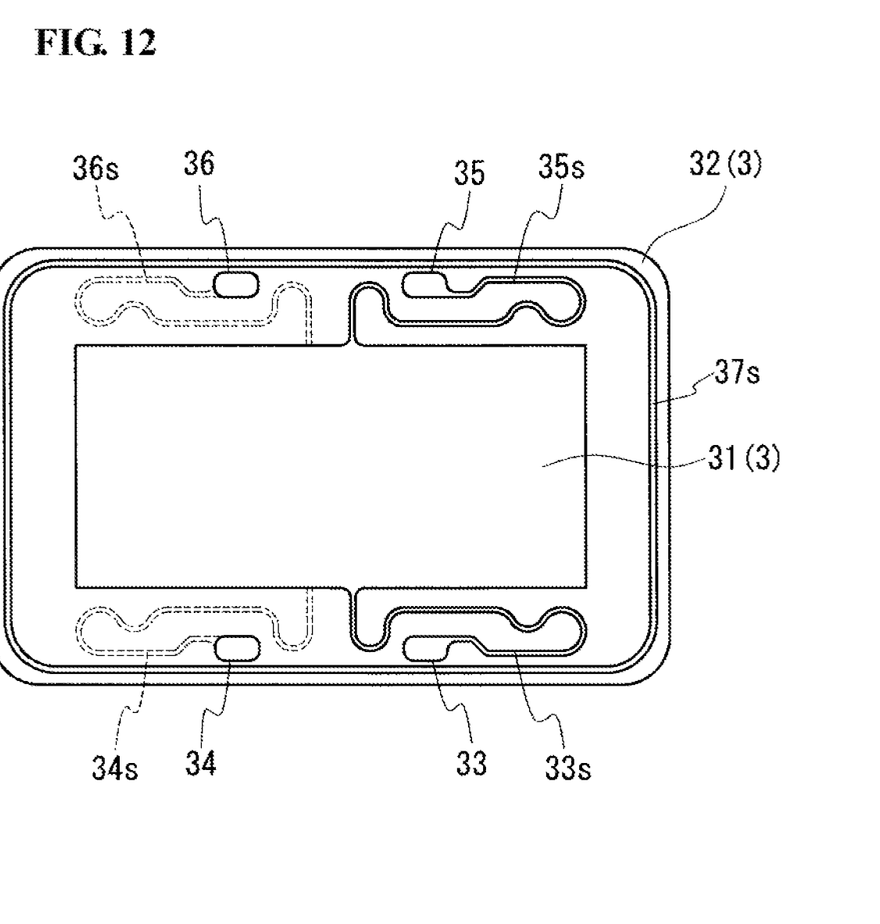
FIG. 12 is a plan view of a cell frame according to Embodiment 8.

Alternatively, the cell frame 3 may be provided so as to have the shape illustrated in FIG. 12. In the cell frame 3 in FIG. 12, slits 33*s*, 34*s*, 35*s*, and 36*s* in the frame body 32 intricately bend in the vertical direction and in the horizontal direction and respectively join the manifolds 33, 34, 35, and 36.

In such cell frames 3 having the shape, formation of thin regions 30 according to Embodiments 1 to 6 also enables suppression of damaging to the frame bodies 32.

Embodiment 9

Figure 13:
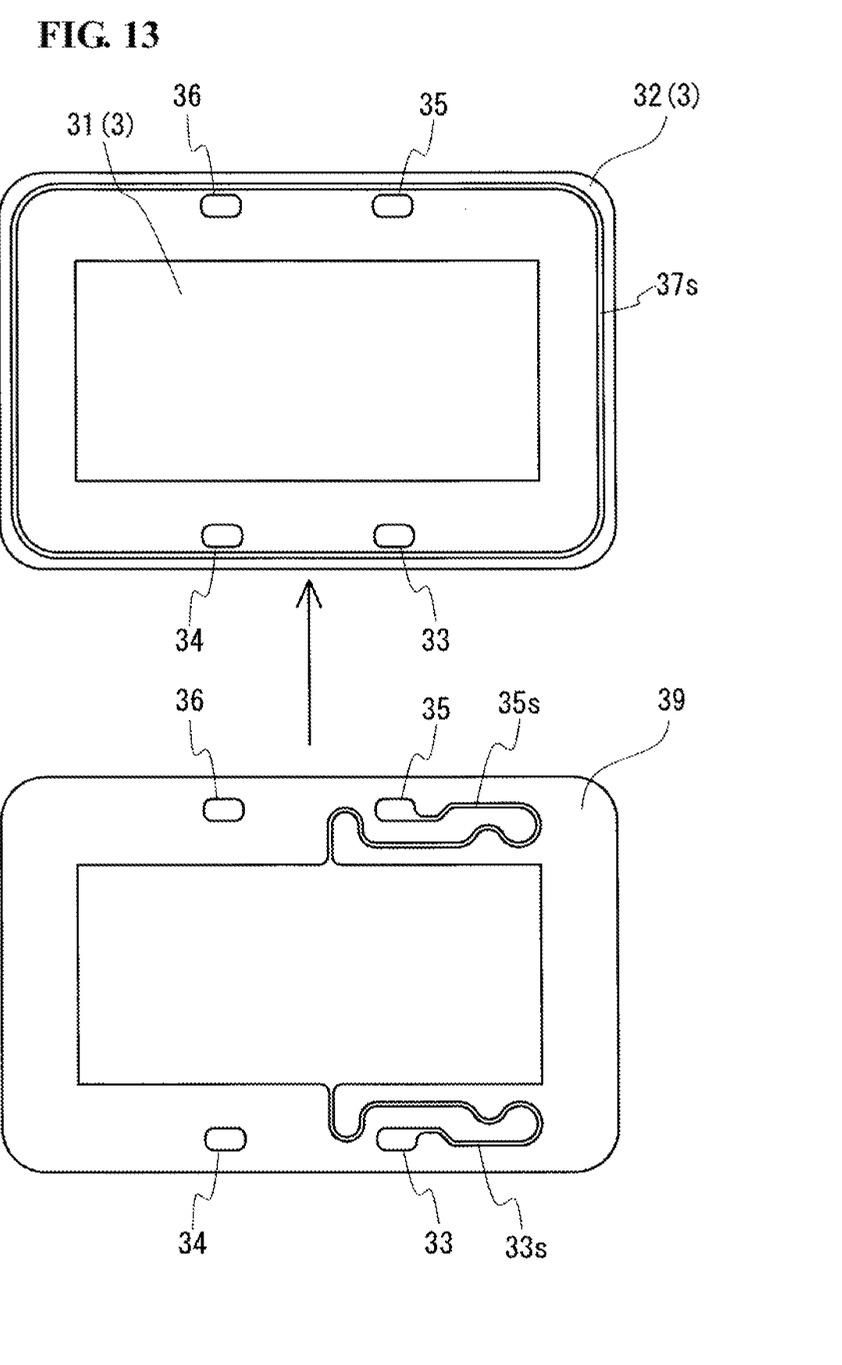
FIG. 13 is a plan view of a cell frame according to Embodiment 9.

Alternatively, the cell frame 3 may be provided so as to have the shape illustrated in FIG. 13. The cell frame 3 in FIG. 13 has no slits extending from the manifolds 33, 34, 35, and 36 to the bipolar plate 31. Instead, slits are formed in a gasket 39 disposed between adjacent cell frames 3. The gasket 39 in FIG. 13 is a gasket 39 that is disposed on a surface (that is illustrated as being exposed in the drawing) of the cell frame 3. This gasket 39 includes manifolds 33, 34, 35, and 36; an inlet slit 33*s*, which has a cutout shape and joins the manifold 33; and an outlet slit 35*s*, which has a cutout shape and joins the manifold 35. Incidentally, a gasket 39 (not shown) that is disposed on a surface (that is illustrated as being hidden in the drawing) of the cell frame 3, includes manifolds 33, 34, 35, and 36; an inlet slit 34s, which has a cutout shape and joins the manifold 34; and an outlet slit 36s, which has a cutout shape and joins the manifold 36.

In such cell frames 3 having the shape, formation of thin regions 30 according to Embodiments 1 to 6 also enables suppression of damaging to the frame bodies 32.

Embodiment 10

Embodiments 1 to 9 described each relate to a cell frame 3 in which a length of the frame body 32 in the width direction (the horizontal direction in the drawing) is larger than a length of the frame body 32 in the length direction (the vertical direction in the drawing). Alternatively, a cell frame may also be provided so as to have a larger size in the length direction than in the width direction.

Embodiment 11

Alternatively, a cell frame may also be provided so as to have the same length in the length direction and in the width direction.

The invention claimed is:

1. A frame body for a cell frame of a redox flow battery, the frame body comprising an outer peripheral portion that is to face and contact, when a plurality of the cell frames are stacked, a frame body of another cell frame that is adjacent to the cell frame,
the outer peripheral portion including a thin region whose thickness gradually decreases in a direction from a center of the frame body toward an outer periphery of the frame body,
the frame body having a through window disposed in a central portion of the frame body, and
the frame body being formed of a resin,
wherein the thickness of the thin region gradually decreases by gradual tapering from a first flat surface of the frame body toward the outer periphery of the frame body, and by tapering from a second flat surface of the frame body toward the outer periphery of the frame body, the tapering from the first flat surface opposing the tapering from the second flat surface.

2. A cell stack for a redox flow battery,
the cell stack comprising a plurality of cell frames that are stacked,
the plurality of cell frames each having a frame body and a bipolar plate supported by the frame body,
wherein the frame body comprises an outer peripheral portion that faces and directly contacts a frame body of another cell frame that is adjacent to the cell frame, and
the outer peripheral portion includes a thin region whose thickness gradually decreases in a direction from a center of the frame body toward an outer periphery of the frame body.

3. The cell stack according to claim 2, wherein, in a section taken along a plane passing through the center of the frame body and extending in a thickness direction of the frame body, the thin region has a sectional shape that is a rectangular shape having rounded corner portions.

4. The cell stack according to claim 2, wherein, in a section taken along a plane passing through the center of the frame body and extending in a thickness direction of the frame body, the thin region has a sectional shape that is a rectangular shape having C-chamfered corner portions.

5. The cell stack according to claim 2, wherein, in a section taken along a plane passing through the center of the frame body and extending in a thickness direction of the frame body, the thin region has a sectional shape that is solely constituted by a curve.

6. The cell stack according to claim 2, wherein, in a section taken along a plane passing through the center of the frame body and extending in a thickness direction of the frame body, the thin region has a sectional shape that includes a rounded tip and a tapered portion is a tapered pencil-tip shape.

7. A redox flow battery comprising the cell stack according to claim 2.

8. The cell stack according to claim 2,
wherein the thickness of the thin region gradually decreases by gradual tapering from a first flat surface of the frame body toward the outer periphery of the frame body, and by tapering from a second flat surface of the frame body toward the outer periphery of the frame body, the tapering from the first flat surface opposing the tapering from the second flat surface.

* * * * *